Figure 1:
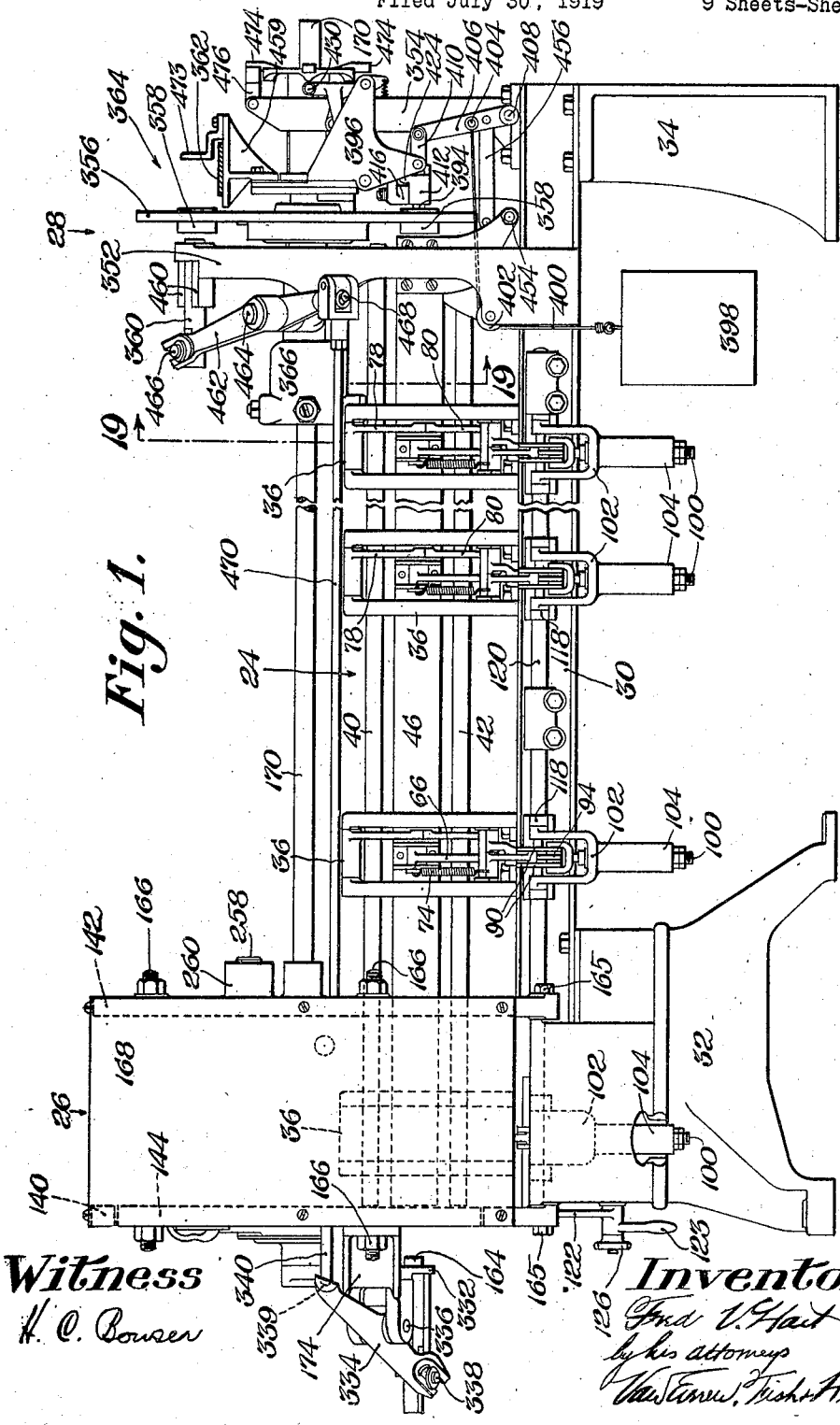

Dec. 4, 1923.

F. V. HART

HEEL PRESS

Filed July 30, 1919

1,475,947

9 Sheets-Sheet 1

Witness
H. C. Bowser

Inventor
Fred V. Hart
by his attorneys
VanEverer, Fish & Hildreth

Dec. 4, 1923.

F. V. HART

HEEL PRESS

Filed July 30, 1919

Witness
H. C. Bowser

Inventor
Fred V. Hart
by his attorneys

Dec. 4, 1923.  
F. V. HART  
HEEL PRESS  
Filed July 30, 1919   9 Sheets-Sheet 3  
1,475,947
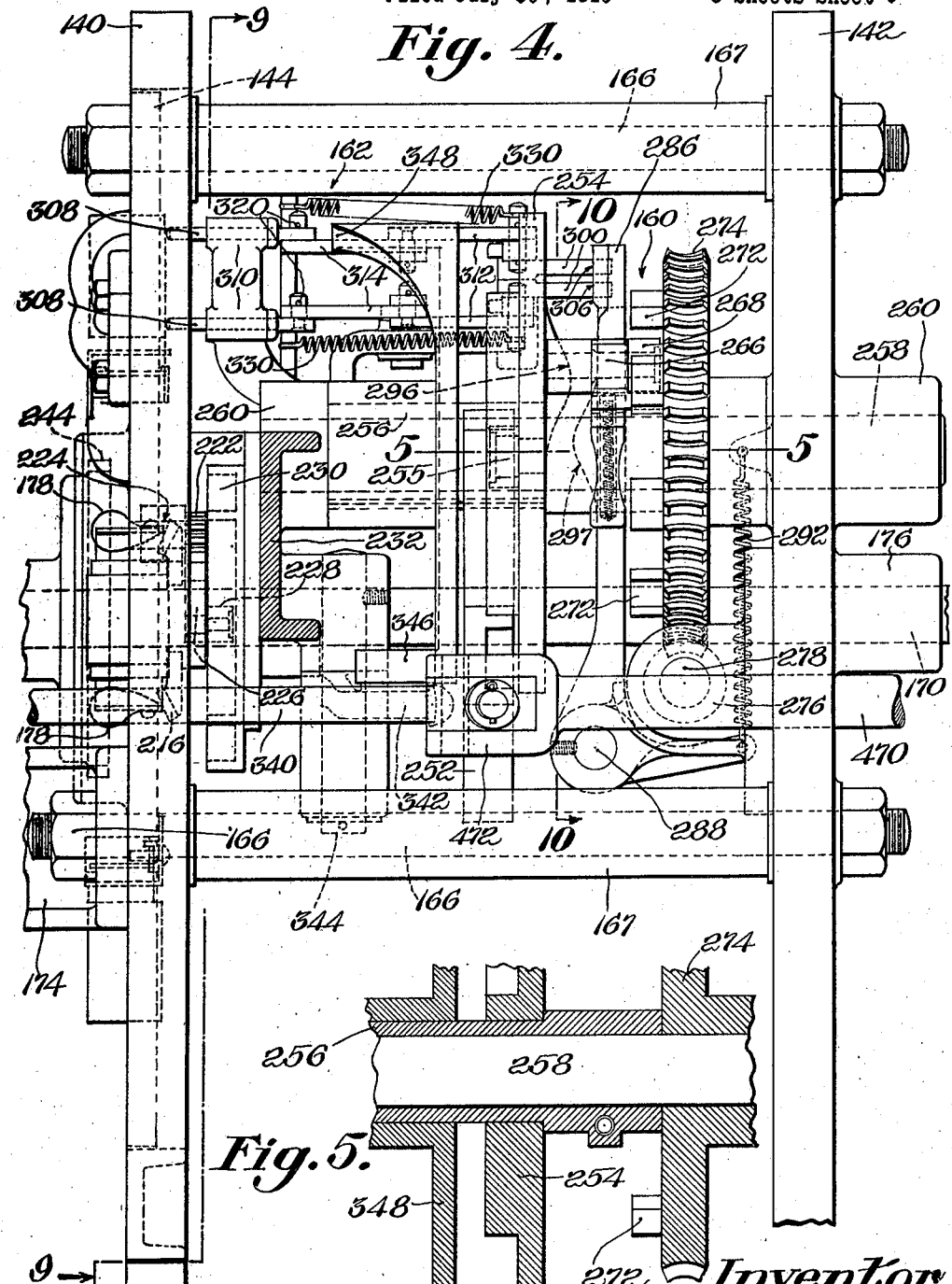
Fig. 4.
Fig. 5.
Witness  
H. C. Bouzen
Inventor  
Fred V. Hart  
by his attorneys Dec. 4, 1923.

F. V. HART

HEEL PRESS

Filed July 30, 1919

1,475,947

9 Sheets-Sheet 4

Witness
H. C. Bowser

Inventor
Fred V. Hart
by his attorneys

Dec. 4, 1923.

F. V. HART 1,475,947

HEEL PRESS

Filed July 30, 1919

9 Sheets-Sheet 5

*Fig. 9.*

Witness
H. C. Bouser

Inventor
Fred V. Hart
by his attorneys
Van Everen, Fish & Hildreth

Dec. 4, 1923.                                                1,475,947
F. V. HART
HEEL PRESS
Filed July 30, 1919            9 Sheets-Sheet 6
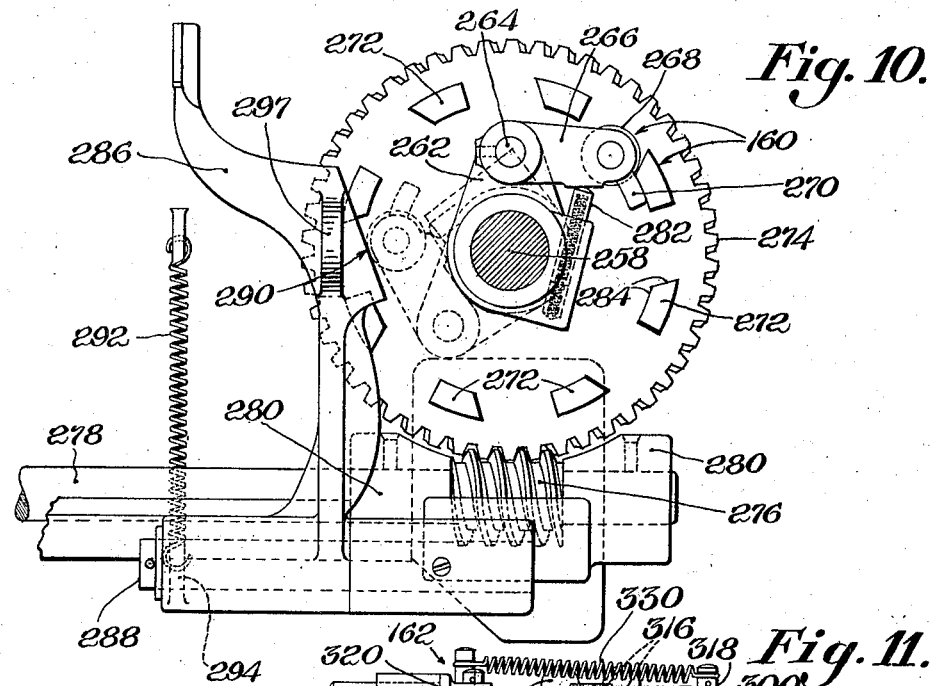
Fig. 10.
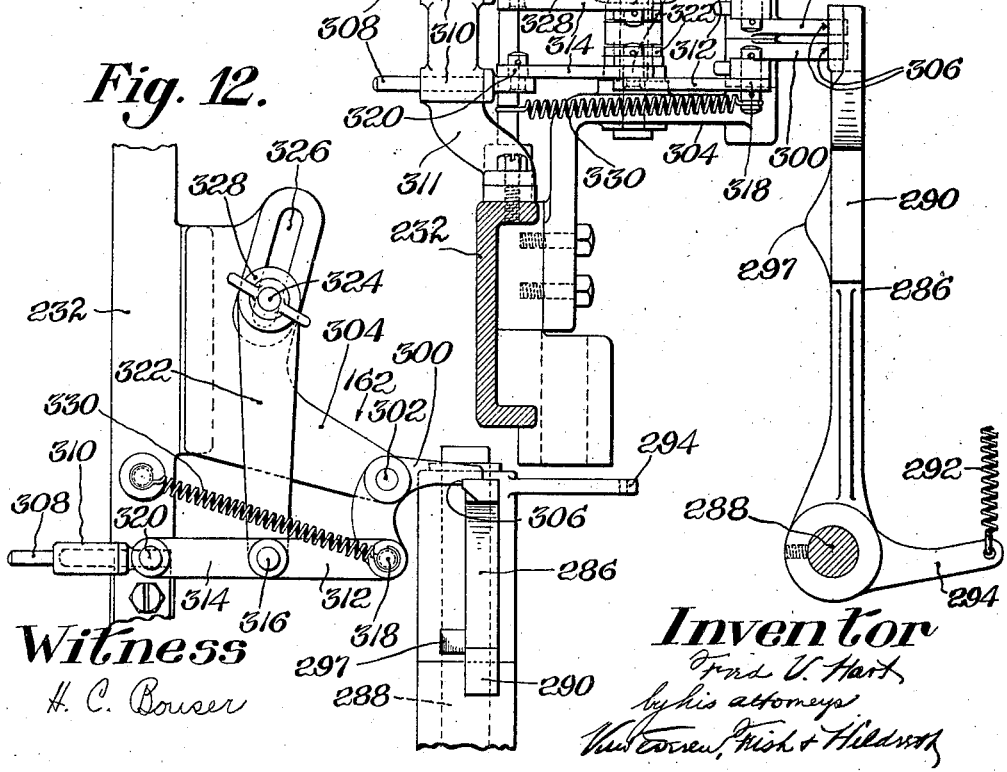
Fig. 11.
Fig. 12.
Witness
H. C. Bowser
Inventor
Fred V. Hart
by his attorneys

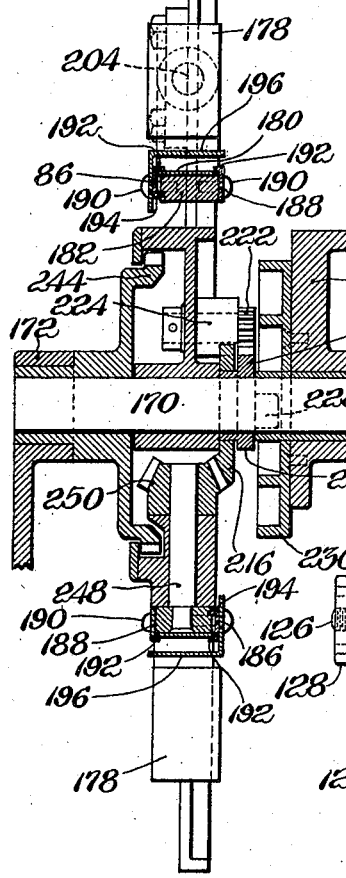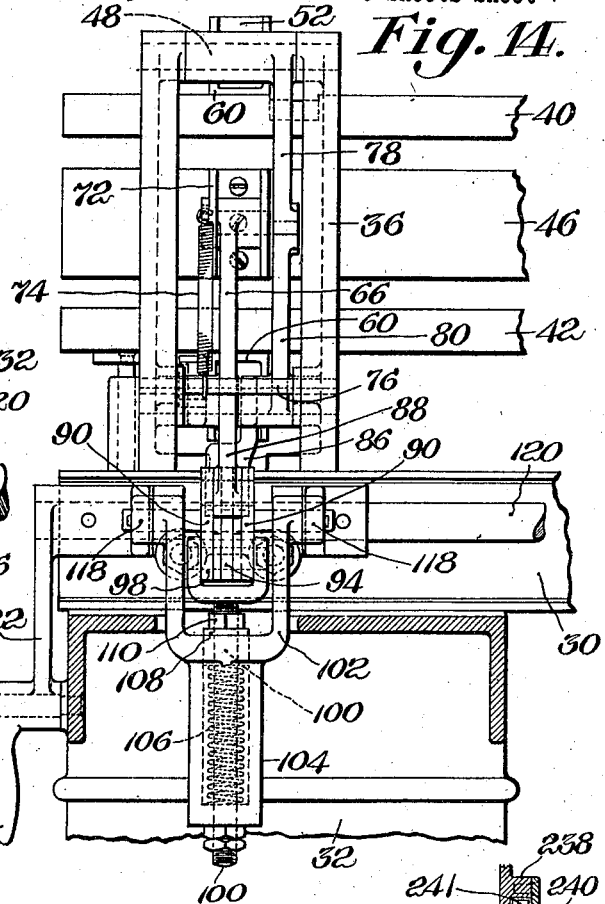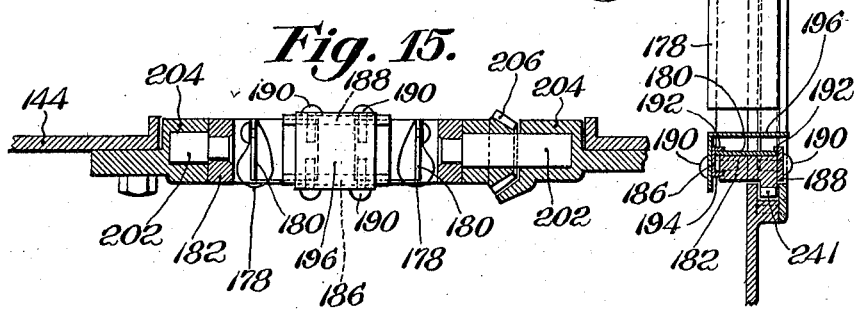

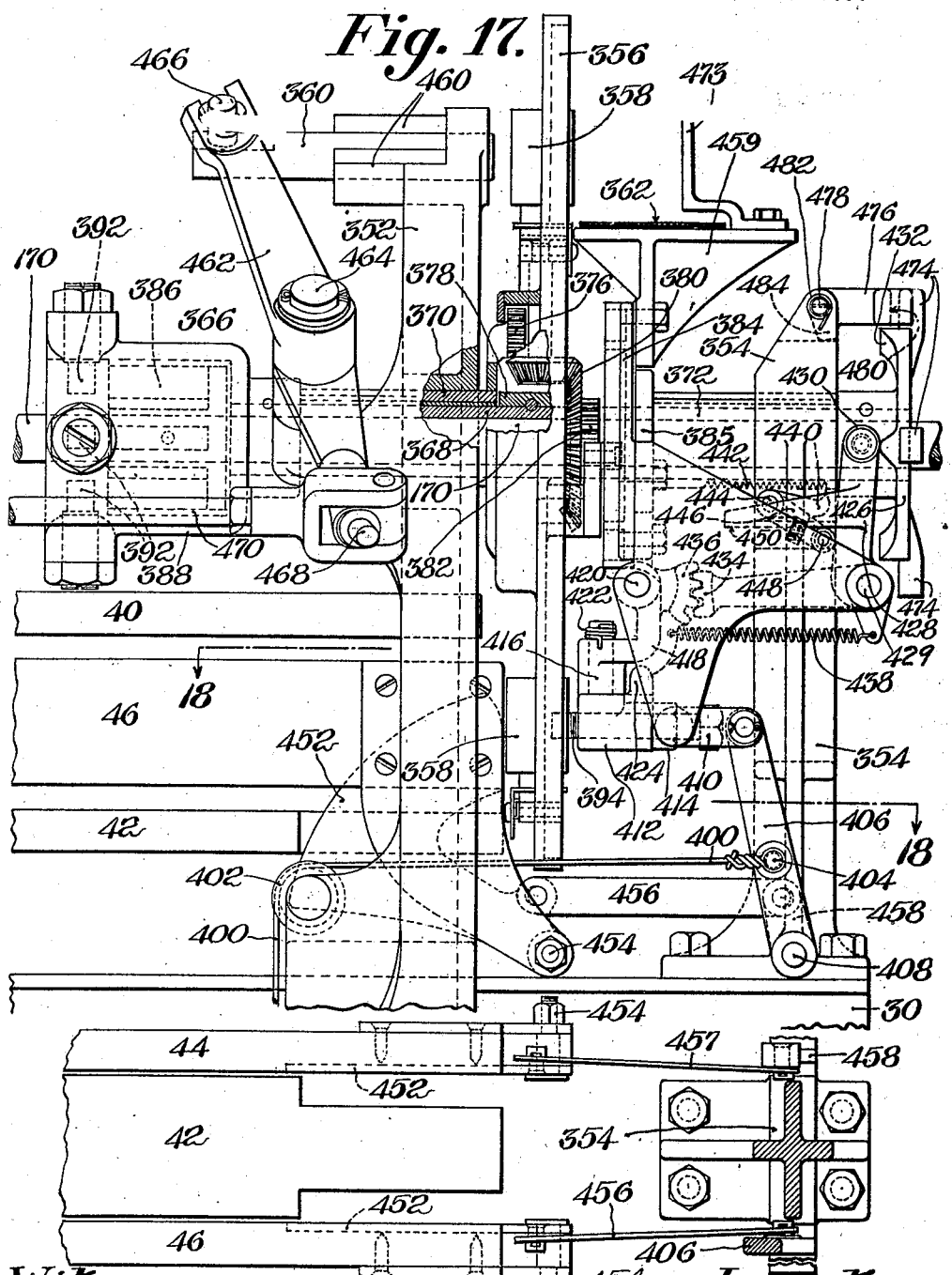

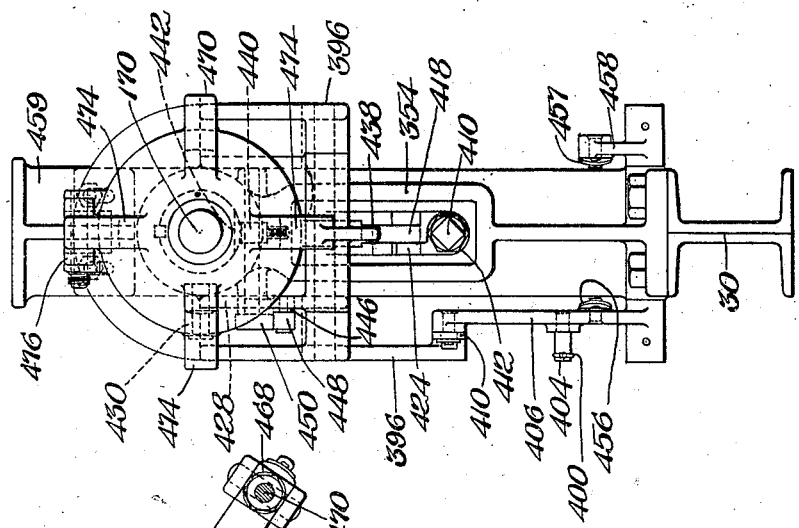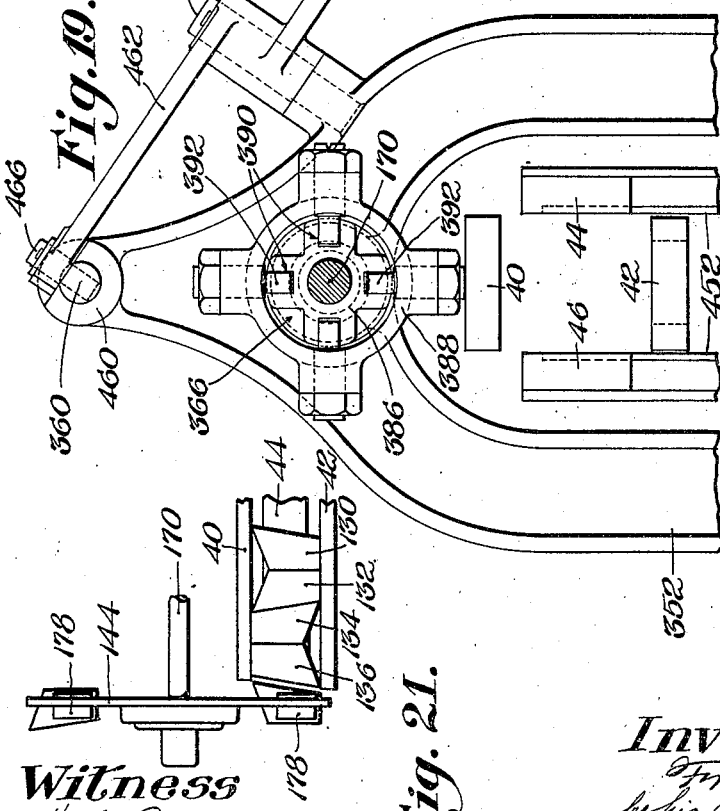

Patented Dec. 4, 1923.

1,475,947

UNITED STATES PATENT OFFICE.

FRED V. HART, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

HEEL PRESS.

Application filed July 30, 1919. Serial No. 314,219.

*To all whom it may concern:*

Be it known that I, FRED V. HART, a citizen of the United States, residing at Lynn, in the county of Essex and State of Massachusetts, have invented certain new and useful Improvements in Heel Presses; and I do hereby declare the following to be a full, clear, and exact description of the invention, such as will enable others skilled in the art to which it appertains to make and use the same.

This invention relates to heel presses and particularly to so-called tube type heel presses and to loading and unloading devices therefor.

Heel presses of this character consist of long, close-fitting, inwardly pressed guides through which freshly pasted heels are made to progress in column formation, the guides resisting frictionally the passage of the heels therethrough so that the lifts are held firmly together during the setting of the paste. These presses are rendered applicable for the purpose of advantageously pressing wedge or pitched heels, or heels having inclined rear ends, by means of the practice of a method of stacking such heels which is illustrated, described and claimed in an application of John B. Hadaway, Serial No. 258,722, filed October 18, 1918, and assigned to United Shoe Machinery Corporation. The method therein described contemplates the arrangement of the heels so that the top lift face of each heel is opposed to and covered by the top lift face of the next, and the larger base face of each heel is opposed to and covered by the adjacent large base face of the next heel, base to base contacting heels being turned 180° relatively to each other to bring about this result. In accordance with this method of stacking wedge heels, the heels are so arranged in the press that when endwise pressure is applied to the column of heels the pressure is distributed evenly over substantially the entire area of every heel face and each wedge heel is as evenly pressed as flat, straight heels are, when stacked in a column. Such stacking of the heels, however, requires constant careful attention and thought on the part of the operator and consequently would be costly and difficult to carry out commercially.

One of the objects of the present invention is to provide automatic means for carrying out the method of stacking wedge heels disclosed in the Hadaway application Serial No. 258, 722, previously referred to.

Another object of the invention is to provide means for receiving the heels after they have passed through the press and for delivering them, uniformly positioned, to a suitable conveyer or receptacle.

A still further object of the invention is to provide certain new and useful improvements in tube type heel presses.

With these objects in view, one feature of the invention consists in the provision of a loading device for a tube type heel press, having means for receiving similarly positioned heels and presenting them successively to the press in different positions such that they may be introduced and stacked therein in accordance with the Hadaway method, and in the provision of means for inserting the heels into the press in the order and position presented.

In the preferred embodiment of this feature of the invention, a rotatable carrier is mounted adjacent one end of the press and is provided with four clamps for receiving the heels. The carrier is arranged to be rotated step by step to bring the empty clamps successively to a receiving station at the top of the carrier and to bring the loaded clamps successively into a delivering position at the bottom of the carrier where they will be located opposite the receiving end of the heel press and are ready to be loaded therein. Means is provided for causing each set of four heels successively supplied in similar positions to the several clamps of the carrier to be differently positioned when presented to the press so that they may be properly stacked therein. The heels are all placed in the clamps in similar positions as the clamps are successively brought to rest at the receiving station. In moving from the receiving to delivering or loading position, one of the clamps is so actuated relatively to the carrier that the heel carried thereby is caused to be reversed 180° about a transverse axis so as to transpose the top-lift and base-lift faces. The succeeding clamp is actuated to offset the effect produced by the rotation of the carrier so that the position of the heel is not changed by said rotation. The heel carried by the next clamp is reversed 180° by the movement of the clamp about a longitudinal axis or an axis which is radial with respect to the carrier and is also inverted by the partial rotation of the carrier so as to transpose the rear and breast edges of the heel. The fourth clamp is not actuated relatively to the carrier and consequently the heel carried thereby is not reversed, but by reason of the rotation of the carrier it is presented in inverted position to the press.

Another feature of the invention consists in the provision of an unloading device for the heel-press having means for receiving the differently positioned heels as they are discharged from the press, restoring them to uniform positions and delivering them. The unloading operation is preferably accomplished by means of a carrier which is rotated in unison with the carrier of the loading mechanism and is provided with a similar set of heel clamps and similar actuating means therefor.

Other features of the invention consist in certain novel and improved constructions, arrangements and combinations of parts hereinafter described and particularly pointed out in the claims, the advantages of which will be apparent to those skilled in the art.

The various features of the invention will be readily understood from the accompanying drawings illustrating the invention in its preferred form and the following detailed description of the construction therein shown.

Figure 6:
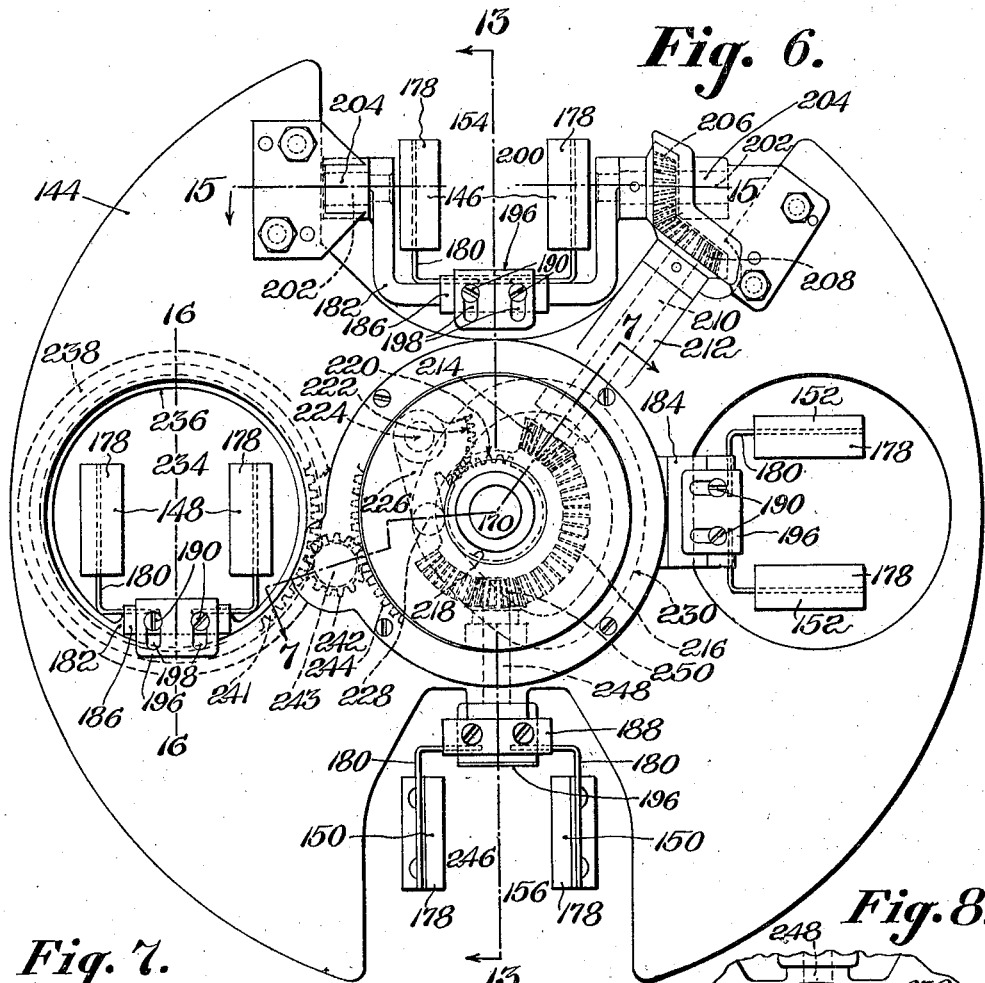
Figures 7, 8:
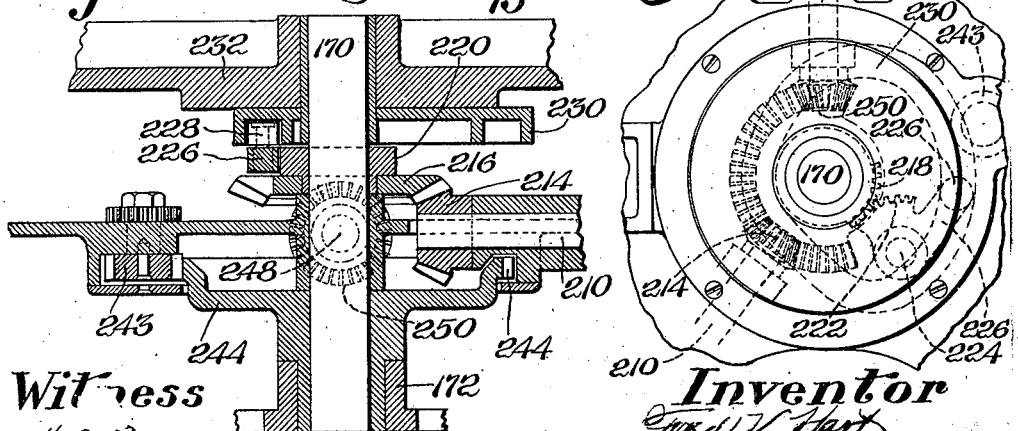

In the drawings, Figure 1 is a view in side elevation of the entire machine; Fig. 2 is a view in end elevation thereof, looking from the left in Fig. 1 and showing the loading mechanism; Fig. 3 is a view in elevation of the opposite end of the machine, showing the unloading mechanism; Fig. 4 is a view in side elevation, partly in section and on an enlarged scale, of a portion of the loading mechanism with the outer casing removed; Fig. 5 is a sectional view taken on the line 5—5 of Fig. 4; Fig. 6 is a view in end elevation showing the carrier of the loading mechanism with its several heel clamps and the actuating mechanism therefor; Fig. 7 is a sectional view taken on the line 7—7 of Fig. 6; Fig. 8 is a view in elevation of the central portion of the carrier of the loading mechanism, showing the parts turned 180° from the positions shown in Fig. 6; Fig. 9 is a sectional view taken substantially on the line 9—9 of Fig. 4; Fig. 10 is a sectional view on the line 10—10 of Fig. 4, showing the main driving clutch; Fig. 11 is a view in side elevation of manually operated mechanism for controlling the driving clutch; Fig. 12 is a plan view of the mechanism shown in Fig. 11; Fig. 13 is a sectional view taken substantially on the line 13—13 of Fig. 6; Fig. 14 is a sectional elevation on the line 14—14 of Fig. 9; Fig. 15 is a sectional view taken on the line 15—15 of Fig. 6; Fig. 16 is a sectional view taken on the line 16—16 of Fig. 6; Fig. 17 is a view in side elevation, and on an enlarged scale, of a portion of the unloading mechanism, certain parts being broken away and shown in section for clearness of illustration; Fig. 18 is a sectional plan view on the line 18—18 of Fig. 17; Fig. 19 is a view in sectional elevation on the line 19—19 of Fig. 1; Fig. 20 is an enlarged view of certain of the parts of the unloading mechanism shown in Fig. 3; and Fig. 21 is a diagrammatic view illustrating the manner in which the heels are stacked in the press.

As shown in Figure 1, the invention comprises, in general, a so-called tube type heel press or guide 24, through which moist or freshly pasted heels are made to progress in column formation against the frictional resistance of inwardly and yieldingly pressed side walls, so that the component lifts of the heels are held firmly together during the drying or setting of the paste; a loading device 26, to which freshly pasted heels are supplied in similar positions and which loads the heels successively, in different positions, into one end of the press 24; and an unloading device 28 which receives the differently positioned heels after they have passed through the press, restores them to uniform positions and delivers them to a suitable receiver or to a conveyer which carries them to a heel compressor.

The entire apparatus is mounted upon a main frame consisting of a longitudinal bar or beam 30 that is supported in a horizontal position by two standards 32 and 34 at opposite ends thereof. The heel press 24 extends horizontally above the beam 30 and is supported at intervals throughout its length upon brackets 36, rising from the beam. The loading device 26 is located adjacent one end of the heel press and is supported by the standard 32. The unloading device 28 is located adjacent the opposite end of the press and is mounted on the beam 30 above the standard 34.

The heel press or guide 24 consists of a box-like tube formed by four relatively movable side pieces or walls 40, 42, 44 and 46, (Figs. 1, 9 and 14) which are arranged with adjacent members disposed substantially at right angles to each other. Each of the four side pieces is spring pressed inwardly to frictionally resist the passage of the heels between them and provision is made for insuring an equal distribution of the pressure among the several pieces. All of the side pieces are adjustable inwardly and outwardly so that the press may be contracted or expanded to accommodate heels of different sizes. The adjustment of all of the side pieces is effected simultaneously, by a single operation. In order to provide for equal distribution of yielding pressure upon the side pieces and also for the simultaneous adjustment thereof, the side pieces of the press are supported at each of the brackets 36 by a plurality of bell crank levers constituting part of a system of pressure distributing or equalizing mechanism. These bell crank levers are severally fulcrumed at each of the brackets 36 and are connected, through a series of springs, with a single adjusting lever which is located at the loading end of the press.

As shown in Figs. 1, 9 and 14, the oppositely disposed side pieces 40 and 42 are supported, at each of the brackets 36, by bell crank levers which are fulcrumed on pivots 48 and 50 (Fig. 9) on said brackets and provided with arms 52 and 54 which are pivoted at 56 and 58, respectively, between pairs of ears 60 projecting outwardly from said side pieces. The oppositely disposed side pieces 44 and 46 are supported at each bracket 36 by bell crank levers one of which is fulcrumed on a pivot 62 on the bracket 36 and the other on the pivot 50, on which is also fulcrumed the lever which supports the side piece 42. The levers supporting the side pieces 44 and 46 are provided with arms 64 and 66 which are pivoted at 68 and 70, respectively, between pairs of ears 72 projecting outwardly from said side pieces. The side pieces 44 and 46 are normally maintained with their inner surfaces in vertical planes by means of flexible links 74 which are formed of completely contracted coiled springs and are connected at one end to extensions of the ears 72 and at the opposite end are secured at 76 to the bracket 36, the links being arranged parallel to the supporting arms 64 and 66. The flexibility of the links 74 permits the side pieces 44 and 46 to tilt laterally if necessary to accommodate themselves to the contour of the curved edges of the heels. The bell crank levers supporting the side pieces 40 and 42 are provided with arms 78 and 80, respectively, which project toward each other and terminate in intermeshing segmental gears, while the bell crank levers which support the side pieces 44 and 46 are provided with arms 82 and 84 which also project toward each other and terminate in intermeshing segmental gears. The intermeshing of said gears insures simultaneous inward and outward movement of the members of each oppositely disposed pair of side pieces. The two bell crank levers that are fulcrumed on the common pivot 50, at each of the brackets 36, are further severally provided with arms 86 and 88, which diverge downwardly from the pivot 50 and are connected by a toggle, by means of which they may be actuated to operate all the bell crank levers concurrently. The toggle comprises a pair of links 90 (Figs. 9 and 14), each of the links being connected at its upper end by a pivot 92 to the lower end of the arm 88, and a link 94, the upper end of which is pivoted at 96 to the lower end of the arm 86. The lower ends of the pair of links 90, together with the link 94, are connected by a knuckle pivot 98 with the head of a bolt 100 by means of which the toggle is operated. The operating bolt 100, for each of the toggles, extends downwardly through a tubular portion of a link 102 which forms a socket 104 for a coiled compression spring 106 that surrounds the bolt between the base of the socket 104 and a circular nut 108 on the bolt within the socket which is held in position by a lock nut 110. The lower end of the bolt 100 projects through an opening in the base of the socket 104 and is provided with a nut 112 and lock nut 114, the former serving to limit the upward movement of the bolt under the influence of the spring 106. There is a link 102 for each bolt 100 and each link 102 is suspended by pivots 116 from the projecting ends of a pair of arms 118 which are secured to a rock shaft 120 that is journaled in bearings on the beam 30. The rock shaft 120 extends substantially the length of the machine and adjacent each bracket 36 it is connected by a pair of arms 118 with one of the several groups of pressure distributing mechanism. At the loading end of the machine the rock shaft 120 is provided with an adjusting arm 122 which terminates in a handle 123 and is slotted at 124 to receive a screw 126 having a hand nut 128 by means of which the arm 122 is clamped in adjusted position.

By loosening the hand screw 126 and operating the arm 122 by means of its handle 123, each of the suspended links 102 may be raised or lowered, and this movement, being transmitted through the spring 106 to the bolt 100 actuates the toggle consisting of the links 90 and 94 to operate concurrently the bell crank levers supporting the side pieces of the heel press and consequently to effect the simultaneous inward or outward adjustment of the side pieces. It will be seen that the means, above described, for adjusting the side pieces of the press permits the adjustment to be effected without varying the lateral pressure upon the side pieces.

In adjusting the press to accommodate heels of a given size and style it is well to first place one of said heels in the press and then swing the arm 122 to move the side pieces of the press inwardly into engagement with the edge of the heel. It will be apparent that while it is desirable to have the four side pieces of the press move simultaneously as described, so long as neither pair has gripped the heel, it is also desirable that each pair shall be permitted to move inwardly or yield outwardly independently of the other pair in order that the side pieces may automatically adjust themselves to accommodate differently proportioned heels of the same size. By means of the construction described above, the desired independent action of the two pairs of side pieces is permitted, inasmuch as the link 102 may adjust itself about the pivot 116, being free to swing in either direction, to permit one of the two pivots 92 or 96 to remain stationary while the movement of the adjusting arm 122 is transmitted solely to the other pivot. For example, if the side pieces 40 and 42 are brought first into engagement with the heel, the pivot 96 will be held stationary, and as the adjusting arm 122 is swung further toward the right (viewing Fig. 9) the link 102 will swing toward the right about the pivot 116 permitting the knuckle pivot 98 to swing upwardly about the stationary pivot 96, the result being that the bell crank lever arms 66 and 64 will be swung further inwardly and the side pieces 44 and 46 will continue their movement toward each other until they also engage the heel. By means of the construction described when the press is adjusted to receive heels of any given size, the side pieces of the press will automatically adjust themselves to accommodate differently proportioned heels of that particular size.

After all of the side pieces of the press have come into contact with the heel which the press is being adjusted to accommodate, the arm 122 is moved a little further in the same direction to slightly compress the springs 106 so that the side pieces will be pressed yieldingly against the heels in the press to frictionally resist their passage therethrough. By means of the hereinbefore described pressure distributing connections, between the springs 106 and the side pieces of the press, the pressure exerted by said springs will be at all times equally applied to the several side pieces.

The manner in which the heels are stacked in the press is illustrated in Fig. 21. As shown therein, one heel is placed in the position of the heel 130. The next heel 132 is then placed with its top-lift face against the top-lift face of the heel 130 so that the breast edges of the two heels are in alinement. The third heel 134 is turned 180° relatively to the heel 132 and is placed against it base to base. The fourth heel 136 is then placed in the same relation with heel 134 that the heel 132 occupies to the heel 130, that is, the heels 136 and 134 are arranged with their top-lift faces together and their breast edges in alinement.

In order to avoid the exercise of the constant care and mental effort required on the part of the operator to manually carry out the above described method of stacking the heels in the press, the loading device 26 has been provided. The operator supplies the heels successively, in similar positions, to the loading device, which automatically effects the desired arranging and stacking of the heels in the press. The use of the loading device of the present invention renders it impossible for improperly positioned heels to be present in the press, as is likely to be the case when the heels are loaded therein by hand, and consequently better results may be obtained and less time and material wasted. Moreover the supplying of the heels to the present loading device may be accomplished by a relatively unskilled operator at a considerable saving of expense.

The loading device 26 is located adjacent the receiving end of the heel press 24 and comprises, in general, a rigid frame consisting of two upright end plates 140 and 142 (Figs. 1, 2 and 4) which, together with associated structural members, are supported by the standard 32 and upon which are mounted the various operating parts; a rotatable carrier 144 (Fig. 6) having four heel clamps 146, 148, 150 and 152, in which the heels are inserted by the operator at a receiving station 154, the clamps being so arranged on the carrier and certain of them being so actuated relatively to the carrier, during the rotation of the latter, that the heels will be presented to the press, at a delivering station 156, in the required positions; means including Geneva gearing 158 (Fig. 9) for imparting a step-by-step rotative movement to the carrier; automatic mechanism including a driving clutch 160 (Figs. 4 and 10) and manually operated control mechanisms 162 (Figs. 4, 9, 11 and 12), for the clutch 160, whereby each step movement of the carrier is effected only if and when a heel is properly introduced by the operator into a heel clamp which is occupying the receiving station 154; and mechanism including a plunger 164 (Figs. 1 and 2) for transferring the heels from the clamps, as they occupy the delivering station 156, into the heel press 24.

The upright end plates 140 and 142 (Figs. 1, 2 and 4) rise vertically from the standard 32 to which they are secured by means of bolts 165, and are connected by means of tie rods 166 that extend through spacing sleeves 167. The end plate 140 is substantially annular in shape and both end plates have similar marginal contours. To the marginal edges of these plates are secured the sides of a curved shell or casing 168 (Fig. 1) which encloses and protects the mechanism contained between the end plates.

The carrier 144 consists of a disk which is arranged to rotate within a circular opening in the annular end plate 140 and is secured to a shaft 170 which extends from the loading device, at one end of the press to the unloading device, at the opposite end thereof. The shaft 170 is journaled at the loading device end of the press in a bearing 172 (Fig. 2) which is supported in a cross-piece 174 on the outside of the end plate 140 and in a bearing 176 in the end plate 142. The carrier disk 144 (Fig. 6) is provided with four openings in each of which is located one of the heel clamps, the openings being arranged to permit the spacing of the clamps at equal distances from the shaft 170 and 90° apart.

Each heel clamp consists of a pair of opposed spring jaws 178 (Figs. 6, 13, 15 and 16) which are adapted to engage the opposite lateral edges of a heel. The clamp jaws 178 are constructed and arranged to permit the heels to be inserted between them, top-lift face foremost, by a movement at right angles to the plane of the carrier disk to firmly hold the heel and to permit its removal by a further movement in the same direction.

To this end, each clamp is secured to one arm of an angle piece 180, the other arm of which is adjustably clamped in alinement with the corresponding arm of the other angle piece so that two clamping jaws 178 are oppositely disposed. The jaws of the clamps 146, 148 and 150 are mounted on supports 182 which are movable relatively to the carrier, while the jaws of the clamp 152 are secured to a supporting block 184 that is rigidly secured to the carrier. Each angle piece 180 is securely held between two clamp plates 186 and 188 (Figs. 13 and 16) which are secured by screws 190, to opposite sides of the supports 182, or the supporting block 184, as the case may be, each clamp plate having a flange 192 arranged to overlap one side of the alined arms of the angle piece 180. The plate 186 is provided with a second flange 194 which enters a groove in the support 182 and serves to hold the rest of the plate away from the support, so that the angle pieces 180, which are wider than the supports, are clamped in position by the tightening of the screws 190 which extend therethrough. A gage 196 (Figs. 6, 13 and 16) is provided for locating the breast edges of the heels relatively to the clamping jaws. This gage 196 consists of an angle piece one arm of which is interposed between the plate 186 and the heads of the screws 190 and is slotted at 198 to permit its adjustment. All of the heels are inserted between the clamping jaws 178, in the same position, that is with the breast edge down, against the breast gage, and with the top-lift face directed away from the operator and toward the press.

In order to carry out the hereinbefore described method of stacking the heels, means is provided for moving the clamps 146, 148 and 150 relatively to the carrier, during the rotation of the latter, after the clamps leave the receiving station 154 and before they reach the delivering station 156. The clamp 146 is turned about an axis normal to a radial axis so that the heel carrier thereby will be brought to rest in loading position with the breast edge down and the base face directed toward the press, as shown at 130 in Fig. 21. The clamp 148 is so actuated that the turning motion of the carrier is offset and there is no change in the position of the heel which will be presented as shown at 132 in Fig. 21. Clamp 150 is turned about a radial axis so that its heel is presented in loading position with breast edge up and its base face directed toward the heel 132, as shown at 134 in Fig. 21. Clamp 152 is not moved relatively to the carrier and consequently its heel is inverted only and will be presented to the press in the position of the heel 136 in Fig. 21.

The clamp 146 is located in an opening 200 (Fig. 6) in the carrier disk 144. In order that the clamp 146 may be rotated about an axis normal to a radial axis, the support 182 for the clamp comprises a U-shaped bar, to the base of which the clamp is secured. This bar is provided at the ends of its upright arms with outwardly projecting studs 202 which are journaled in bearings 204 on the carrier disk 144. Secured to one of studs 204 is a bevel gear 206 which meshes with a bevel gear 208 on a shaft 210 which is radially disposed on the carrier disk 144 and is journaled in a bearing 212 thereon. A bevel pinion 214 is secured to the lower end of the shaft 212 and meshes with a segmental bevel gear 216 which is rotatable on the shaft 170 and is compounded with a segmental spur gear 220. Meshing with the segmental spur gear 220 is a gear segment 222 which is pivotally mounted at 224 on the carrier disk. The gear segment 222 is provided with an arm 226 (see also Fig. 4) carrying a cam roll 228 which enters a groove in a stationary cam 230, the cam being secured to a cross-bar 232 which is bolted on the rear of the end plate 140. As the carrier rotates, the roll 228 is carried around in the groove of the cam 230, and is actuated thereby to impart the required rotation of 180° in one direction to the clamp 146 while it is transferring a heel into delivering position and to give a similar rotation in the opposite direction to said clamp after its heel has been loaded in the press and the empty clamp is being brought back into position to receive another heel.

The clamp 148 is mounted within a circular opening 234 in the carrier disk 144, its support 182 being an integral part of a rotatable ring 236 (Figs. 6 and 16). The ring 236 is supported, adjacent one side of the carrier disk 144 by an annular flange 238 that is concentric with the edge of the opening 234, the ring overlapping said edge and being confined between the surface of the disk adjacent said opening and a retaining ring 240 which is secured to the flange 238 and overlies the ring 236. The ring 236 is provided, at its outer periphery, with gear teeth 241 and is driven as the carrier disk 144 rotates, by means of an idler gear 242 compounded with an idler gear 243 which meshes with a stationary gear 244, the hub of which is supported in the crossbar 174 and forms the bearing 172 for the shaft 170.

The clamp 150 is mounted in an opening 246 in the carrier disk and is rotatable about an axis radial with respect to the carrier. For this purpose the support 182 for the jaws of the clamp 150 is secured to one end of a shaft 248 which extends radially through a suitable bearing in the carrier disk. In order that the clamp 150 may be turned relatively to the carrier 144 a bevel pinion 250 is secured to the inner end of the shaft 248 and meshes with the segmental bevel gear 216 above referred to. When the segmental gear 216 is actuated to return the empty clamp 146 to normal position, the clamp 150 is rotated 180° about a radial axis to present its heel in the required position to the press. After the heel carried by the clamp 150 has been loaded into the press, said clamp is rotated an equal number of degrees in the opposite direction, while the clamp 146 is turning its heel into position to be presented to the press.

A rotary step-by-step movement is imparted by the Geneva gearing 158 to the carrier 144. The gearing 158 comprises a star-wheel 252 (Figs. 4 and 9) that is secured to the main shaft 170, and a driver consisting of a disk 254 from which projects a driving-pin 255. The driving disk 254 is keyed to a sleeve 256 which is rotatable on a shaft 258 that is fixed in a pair of brackets 260, one on the end plate 142 and one on the cross bar 232. In order that the operation of the machine may be timed exactly in accordance with the speed with which the operator is able to introduce the heels into the heel clamps, each step movement of the carrier is initiated only if and when a heel is properly inserted in the clamp by the operator, the machine then making one complete cycle of operations and coming automatically to rest. For this purpose the driver 254 is actuated by the driving clutch 160 which is arranged to cause, at each operation, one complete rotation of the sleeve 256.

The driving clutch 160 comprises an arm 262 (Figs. 4 and 10) integral with the sleeve 256. The arm 262 is connected, by means of a pivot 264 to one end of a thrust link 266 and the thrust link is provided, at its free end, with a roll 268 and a lug 270. The roll 268 and the lug 270 are adapted to cooperate with a series of drive lugs 272 projecting laterally from a worm wheel 274 which is rotatably mounted on the shaft 258. The worm wheel is driven constantly, during the operation of the machine, by a worm 276 on a drive shaft 278 which turns in bearings 280 on the end plate 142 and may be provided with a drive pulley 281 and belted to suitable source of power. The thrust link 266 is engaged by a spring pressed plunger 282 that is mounted in the hub of the arm 262, which tends to swing the thrust link outwardly so that the roll 268 and the lug 270 may engage suitably formed surfaces 284 on one or another of the drive lugs 272 on the worm wheel. When the parts are in such engagement, the worm wheel drives the sleeve 256 through the thrust link 266 and the arm 262, whereby the carrier 144 is rotated.

The operation of the clutch is controlled by means of a trip-lever 286 (Figs. 4, 10, 11 and 12) which swings vertically upon a pivot stud 288 projecting from a bracket that is formed on the bearing lugs 280. The trip lever 286 is provided with a lateral projection having an inclined cam face 290 that is adapted to cooperate with the roll 268. The lever 286 is acted upon by a spring 292, one end of which is secured to the end plate 142, while the other end is fastened to an arm 294 projecting from the pivoted end of the trip lever. This spring tends to hold the trip lever with the cam face 290 in position to cooperate with the roll 268. When said cam face is in the path of movement of the roll 268, the latter, in revolving around the cam shaft 258, engages and rides upwardly upon the inclined face 290 whereby the roll is raised out of engagement with the drive-lugs 272, and the driving connection between the worm wheel and the sleeve 256 is thereby interrupted and the sleeve and carrier are brought to rest. This driving connection is restored by swinging the trip-lever about the stud 288 so as to disengage the cam face 290 from the roller 268, and thereby permit the latter to be swung downwardly again into engagement with whichever of the drive lugs 272 may be passing beneath it at the moment.

The trip-lever 286 is caused to be actuated to restore the driving connections between the worm wheel 274 and the sleeve 256 by the action of the manually operated mechanism 162 upon the introduction of a heel into one of the heel clamps of the carrier. The rotation of the sleeve 256 causes the Geneva gearing 158 to impart a step movement to the carrier. Before a second step movement is imparted to the carrier, the trip-lever 286 is actuated by the engagement of a lateral cam projection 296 on the driver 254, (Fig. 4) with a projection 297 on the lever 286, to return the inclined cam face 290 into the path of the roll 268, so that another step movement of the carrier will not be permitted to occur until another heel has been properly positioned in the next heel clamp.

If the heel has not been properly inserted in the clamp before the sleeve 256 has made a complete revolution, the driving connection between the worm wheel 274 and the sleeve will be again interrupted and the machine automatically stopped. If, however, the operator has properly supplied a heel to the clamp before the revolution of the sleeve 256 has been completed, the driving connections will not be interrupted and the next step movement of the carrier will occur without delay. In this way the driving connections are prevented from being interrupted so long as heels are supplied to and properly positioned in the heel clamps of the carrier as fast as they can be operated upon by the machine, and if the operator fails at any time to supply them at this speed, the step movements of the carrier are delayed until the heels are properly supplied. The operation of the machine, therefore, is timed in accordance with the speed with which the operator is able to introduce the heels into the heel clamps.

The manually controlled mechanism 162 includes a pair of latch levers 300 (Figs. 4, 11 and 12) both of which are pivoted upon a stud 302 that is secured in a bracket 304 on the cross-bar 232, one of the latch levers being superimposed directly above the other. Each latch lever 300 is provided with a shoulder 306 arranged to engage and hold the trip lever 286 in operative position, against the tension of the spring 292 with the inclined cam face 290 in contact with or in the path of the roll 268. The latch levers 300 are operated to release the trip lever 286 from this position by two trip pins 308, one pin controlling each latch lever. The trip pins 308 are arranged one above another in a slide horizontally in bearings 310 in a bracket 311 secured to the cross-bar 232 and project forwardly toward the carrier 144 so as to be in the path of the heel which is inserted in the clamp at the receiving station 154. Each latch lever 300 is connected with its respective trip pin 308 by means of two links 312 and 314 which are pivotally connected, end to end, at 316 and are also severally pivoted at 318 and 320 to the corresponding lever 300 and trip pin 308, respectively. The middle pivot 316 of each set of links is carried by one end of an arm 322, the opposite end of which is pivoted on a bolt 324 which is adjustably secured in a slot 326 in the bracket 304 by a wing nut 328.

A spring 330 connects each pivot 318 with the cross-bar 232 and tends to hold both the latch levers 300 with their shoulders 306 in engagement with the trip lever 286. By loosening the wing nut 328 the pivot stud 324 of the arm 322 may be adjusted in the slot 326 to move the pivot 316 toward or from the bearing 310, thus determining the distance which the trip pins 308 are permitted to project from the bearings, and in this way adjusting the trip mechanism to be operated by heels of different thicknesses. By reason of the angle of the slot 326 it will be seen that the adjustment of the lever 322 will effect an inward or outward movement of the trip pins 308 in their bearings without swinging the latch levers 300 out of operative positions.

When a heel is inserted in one of the heel clamps it comes into engagement with one or both of the pins 308. It is obvious that the trip lever 286 will not be released until both latch levers 300 have been actuated and this will not occur until both trip pins 308 have been moved an equal amount by the heel. This construction therefore insures that the heels will be inserted squarely in the clamps.

After each heel has been brought into delivery position opposite the receiving end of the heel press it is loaded therein by means of the plunger 164 which pushes it from between the spring jaws of the clamp and into the open end of the press, at the same time advancing the column of heels in the press to make room for the new heel. For this purpose the plunger 164 is arranged to reciprocate in a horizontal guideway 332 (Fig. 1) and is actuated by means of a lever 334 which is fulcrumed at 336 on the end plate 140 and one end of which is pivotally connected with the plunger at 338. The opposite end of the lever 334 is recessed at 339 to receive one end of a bar 340 which has a sliding bearing in the end plate 140. Between the end plates 140 and 142 the opposite end of the bar 340 enters a socket in an arm 342 (Figs. 4 and 9) that is pivoted on a stud 344 projecting downwardly from the cross-bar 232. The arm 342 carries a roll 346 which is operated by a cam 348 that is keyed to the sleeve 256. A spring 350 which is coiled about the fulcrum of the lever 334 maintains the plunger 164 in its normal retracted position and holds the roll 346 against the periphery of the cam 348. After each step movement of the carrier has occurred, the high part of the cam passes beneath the roll 346 moving the loading plunger to transfer a heel from the clamp at the delivering station to the heel press. The plunger thus applies at each heel-introducing movement a pressure impulse to the entire column of heels in the heel press and advances them against the frictional resistance of the sides thereof. The press is of sufficient length to insure the proper setting or drying of the paste during the progress of the heels therethrough.

In order that the heels, after they have passed through the tubular heel press may be automatically transferred to a heel compressor in proper positions to be handled with facility, the unloading device 28 is provided, which receives the variously positioned heels as they emerge from the press, rearranges them in like positions, and delivers them, thus uniformly positioned, to a suitable conveyer which may transfer them to the compressor. This unloading device performs the functions described more quickly and accurately than they could be performed manually and effects a considerable saving of time, labor and expense.

The unloading device 28 is located adjacent the rear or delivery end of the heel press 24 and comprises, in general, two upright supporting members 352 and 354 (Fig. 17), which are secured to the rear end of the beam 30 and support suitable bearings for the rear end of the shaft 170, to which the loading carrier is secured; an unloading carrier 356, similar in construction to the loading carrier 144, which is secured to a sleeve that is rotatable on the shaft 170 and provided with four heel clamps 358 similar to the clamps of the loading carrier, which are successively brought into position to receive the heels as they emerge from the press and which restore the heels to uniform positions and bring them to rest at a delivering station; and a plunger 360 connected to and operating in unison with the loading plunger 164 for transferring the heels from the clamps of the unloading carrier to a conveyer 362 by which they are removed to the heel compressor.

After the heel press has become filled, a single heel is discharged from the delivery end thereof, into one of the clamps 358 of the carrier 356 of the unloading device, each time a fresh heel is introduced at the receiving end of the press by the loading plunger 164, the carrier 356 moving concurrently with the loading carrier 144, after each advancing movement of the heels through the press. By reason of the yielding character of the heels the column will be compressed by the repeated pressure impulses of the loading plunger. The degree of compression necessarily varies, from time to time, on account of the continual changing of the individual heels of the column which renders it impossible to reproduce perfectly, at the delivery end of the press, the constant feeding movements which occur at the receiving end thereof. The heels at the delivery end therefore, may not be advanced uniformly. Accordingly, while each variable feeding movement will introduce a heel between the jaws of one of the clamps on the unloading carrier, the movement may not always be sufficient to feed the heel clear of the end of the press. In such a case the carrier will not be free to make its next partial rotation which is to carry the heel toward the plunger 360.

In order to insure that the end heel shall be completely ejected from the press before the carrier is started, the carrier is normally disconnected from the driving shaft 170 and is adapted to be connected therewith by a clutch 366, (Figs. 1, 17 and 19) the operation of which is controlled by the feeding movement of the end heel. When the end heel has been fed a certain distance beyond the end of the press, the clutch 366 is operated to connect the carrier 356 with the driving shaft 170. This distance is somewhat less than the thickness of the heel being operated upon, in order that the succeeding heel may be left projecting from and supported by the side pieces of the press, but is, however, greater than the maximum amount of compression of the heel column. In this manner it is practicable to obtain the required length of feed of the end heel beyond the press at each successive feeding movement, and thus to insure the advancing of a heel clear of the press at each stroke of the loading plunger so that the two carriers 144 and 356 will be kept in the proper timed relation with each other.

To this end the carrier 356 is mounted with provision for lateral movement toward and from the press and means is provided whereby each heel, after it has been fed between the jaws of the clamp on the carrier and has reached a position clear of the press, will, during the continuation of its feeding movement, push the carrier bodily with it away from the press. This movement operates the clutch 366 to connect the unloading carrier 356 with the driving shaft 170 so that it will be operated in unison with the loading carrier 144 when the next movement of the latter occurs.

For the purpose described the carrier 356 is secured to a sleeve 368 (Fig. 17) that is mounted to slide on the shaft 170 but normally is not connected to be driven thereby.

The sleeve 368 is journaled, at one side of the carrier 356 in a bearing sleeve 370 which is splined in a guideway in the upright 352, and at the opposite side of the carrier the sleeve is journaled in a bearing sleeve 372 which is splined in a guideway in the upright 354. Keyed to the bearing sleeve 370, adjacent the carrier 356, is a gear 376, while between the hub 378 of the carrier and the bearing sleeve 372 is a segmental bevel gear 380 which is compounded with a segmental spur gear 382 that is rotatable on the sleeve 368 and located adjacent the hub 378. Beyond the spur gear 382 is located a stationary cam 384 that is secured to a flange 385 at one end of the bearing sleeve 372. The gear 376, the segmental gears 380 and 382, and the cam 384 correspond to the gear 244, segmental gears 216 and 220, and cam 230 respectively which are associated with the loading carrier 144, and the functions performed by each set of members are similar.

The clutch 366 is located adjacent the opposite end of the bearing sleeve 370 and comprises an inner driving member 386, which is fixed to the shaft 170 and an outer member 388 which is secured to the sleeve 368 and is adapted to be driven by the inner member 386. The clutch member 386 is provided with a plurality of longitudinal grooves 390 and the clutch member 388 consists of a cylindrical shell which surrounds the inner member 386 and is provided with a series of radial pins 392 projecting inwardly therefrom and arranged to enter the grooves 390 in the inner member when the carrier 356 is shifted away from the press and thus to cause the carrier to be driven by the shaft 170.

The continued feeding movement of the end heel after passing clear of the press, is transmitted to the carrier 356 for the purpose of shifting the carrier away from the press through the medium of an abutment 394 which is connected with a pair of brackets 396 that are secured to the flange 385 of the bearing sleeve 372. The carrier is moved in the opposite direction to return it into position to receive the next heel from the press by means of a weight 398 (Fig. 1). To this end the weight 398 is suspended by a cord 400 which passes over a pulley 402 and is connected at 404 to a lever 406. The lever 406 is secured to a rock shaft 408 journaled in the upright 354, the opposite end of the lever being connected by a link 410 with the bracket 396.

The abutment 394 normally projects between the jaws of the heel clamp which is positioned to receive a heel from the press and is adapted to be swung out of the path of the clamps after it has performed its function of shifting the carrier. To this end, the abutment comprises a screw threaded bolt which extends through a block 412 so that it may be adjusted toward or from the heel press to adapt the unloading mechanism to act upon heels of different thicknesses. The block 412 is provided with a lock nut 414 for securing it in adjusted position, and it is pivotally connected by means of a stem 416 with the lower end of an arm 418 which is pivoted at 420 on the bracket 396 to swing toward and from the carrier 356. A spring 422 is arranged to hold the block 412 in normal position with a stop lug 424 that is formed thereon in contact with the arm 418 so as to properly position the abutment 394 horizontally with respect to the adjacent heel clamp. The arm 418 is actuated by means of a cam 426 that is secured to the sleeve 372 and a bell crank cam lever 428 that is fulcrumed at 429 on the bracket 396. One arm of the lever 428 carries a cam roll 430 which cooperates with a series of cam faces 432 on the cam 426 while the other arm of the lever 428 is provided with segmental gear teeth 434 which intermesh with the teeth of a segmental gear 436 that is formed on the arm 418. A spring 438 connects the arm 418 with the lever 428 so as to hold the cam roll 430 against its cam 426 and position the abutment 394 vertically with relation to the adjacent heel clamp.

During the feeding of the column of heels through the press, the cam 426 holds the abutment 394 in the path of the end heel, but upon the completion of the feeding movement, as the carrier starts to rotate, the cam 426 permits the abutment 394 to be quickly removed from between the jaws of the heel clamp by a swinging movement of the arm 418 about its pivot 420. If the downward swinging movement of the abutment does not occur quickly enough to completely remove it from the path of the clamp in time to prevent contact therewith, the abutment will swing freely in a sidewise direction by reason of its pivotal connection with the arm 418, and thus will not interfere with the rotation of the carrier. This construction avoids danger of interference between the carrier and the abutment when thin heels are being operated upon and the abutment is projected a considerable distance between the jaws of the heel clamps.

In order to prevent the carrier 356 from being immediately returned toward the heel press by the pull of the weight 398, when the abutment is swung away from the heel which engaged it, the cam 426 also permits a spring pressed detent 440 to engage one of a series of teeth 442 in the bearing sleeve 372 so as to lock the carrier in the position to which it was shifted laterally by the last feeding movement of the heel column. To this end the detent 440 is fixed to a rock shaft 444 that is journaled in a bearing in the upright 354 and to which is secured an arm 446 carrying a roller 448. The roller 448 is adapted to be engaged by a finger 450 projecting from an upwardly extending arm of the bell crank lever 428. Normally the finger 450 holds the detent 440 away from the teeth 442 but as soon as the carrier 356 and the cam 426 commence to rotate the finger 450 rises and permits the detent to come into engagement with the teeth.

Upon the completion of a partial rotation of the carrier 356, another one of the faces 432 of the cam 426 is brought into engagement with the cam roll 430, returning the bell crank lever 428 to the position shown in Fig. 17, thereby disengaging the detent 440 from the teeth 442 and also restoring the abutment 394 to its normal position as shown in said figure. The pull of the weight 398 then causes the carrier 356 to slide laterally toward the heel press until the abutment 394 comes into contact with the end-most heel therein.

The heels in the press are liable to adhere to each other more or less on account of the presence of paste on the sides of the press or on the top-lift or base faces of the heels, and in order to insure that the end-most heel shall be readily separated from the column of heels without possibility of laterally displacing the adjacent heel, a pair of leaves 452 (Figs. 17 and 18) are pivotally mounted at the delivery end of the press and arranged to be swung into position to provide lateral support for the heel next behind the end heel in the column. These leaves or supports 452 consist of thin metal plates which normally lie with their inner faces flush with the inside surfaces of the vertical side pieces of the press and with their rear edges flush with the edges of said side pieces at the delivery end of the press, and are adapted to follow up the end heel of the column after it has passed clear of the end of the press, thus providing side supports for the adjacent heel throughout the entire width of the side edges thereof. To this end the leaves 452 are pivoted at 454 to swing in vertical planes and are actuated by the lateral movements of the carrier, one of the leaves being connected by means of a link 456 with the lever 406, while the other leaf is connected by a similar link 457 with an arm 458 that is secured to the rock shaft 408 at the opposite end thereof from the lever 406. Thus, after the end heel has been completely ejected from the press and has come into engagement with the abutment 394, the carrier is shifted toward the right in Fig. 17 and the leaves are swung beyond the end of the press, and when the carrier returns toward the press the leaves are swung backwardly a corresponding amount. The leaves therefore provide a practical means which operates after the end heel has been ejected from the press to extend the side walls of the press as required to provide lateral support for the succeeding heel in the column so as to prevent sidewise displacement of said heel when the end heel is removed by the carrier 356.

Each heel after being fed into a clamp at the bottom of the carrier 356 is raised by the rotation thereof, and after being properly positioned and brought to rest at the top of the carrier, each heel is ejected from its clamp and loaded upon the conveyer 362 which is supported adjacent the carrier upon a shelf 459, (Figs. 1 and 17) that is secured to the stationary cam 384. The ejection of the heels from the clamps of the carrier 356 is accomplished by means of the plunger 360 which reciprocates in a horizontal guideway 460 in the upright 352, operating in unison with the plunger 164 by which the heels are loaded into the press. To this end the plunger 360 is actuated by a lever 462 that is fulcrumed at 464 on the upright 352, one end of the lever being pivotally connected to the plunger at 466 while the opposite end is connected by a universal joint 468 to a rod 470 which is, in turn, connected at 472 (Fig. 4) with the arm 342 by which the loading plunger 164 is actuated. After being placed on the conveyer 362 the heels are transferred to the heel compressor.

Inasmuch as the number of heels in the press varies according to the thicknesses of the heels being operated upon the positions of the heels emerging from the unloading end of the press will not always be the same relatively to the heel which is concurrently introduced into the loading end of the press. In order that the heels may be restored to the position in which they were uniformly presented by the operator to the loading carrier 144, the unloading carrier 356 is adjusted on the shaft 170 before the first heel from the press is loaded therein, so that the clamp of the unloading carrier which corresponds to the one in which that particular heel which is just emerging from the press was previously held in the loading carrier, shall be opposite the end of the press in position to receive the heel when it is ejected therefrom. With the unloading carrier adjusted or set in this manner, each succeeding heel emerging from the press is received in a clamp corresponding to the clamp which held that particular heel on the loading carrier, and the movements imparted to each heel by the unloading carrier will be similar to those imparted thereto by the loading carrier. Thus the unloading carrier, as it rotates, turns each heel 180° in the plane of the carrier, and in addition, those clamps which correspond to the relatively movable clamps of the loading carrier, are severally turned, with respect to their carrier, 180° in the same direction as said corresponding clamps, thus bringing the heels carried thereby into positions corresponding to the positions of said heels when originally presented to the loading carrier. This causes all the heels to be uniformly positioned when they come to rest at the top of the unloading carrier 356 and opposite the unloading plunger 360. The heels may then be pushed from between the clamp jaws and automatically loaded on the conveyer 362 which transfers them to the compressor. A plate 473 (Fig. 17) may be mounted on the bracket 459 for preventing overmotion of the heels as they are pushed sidewise onto the conveyer and thus insuring their accurate alinement thereon.

In order to facilitate the adjusting or setting of the carrier 356 with its clamps properly positioned relatively to the clamps of the carrier 144, four outwardly projecting radial lugs 474 (Figs. 17 and 20) are formed at the periphery of the cam 426 and an arm 476 is pivoted at 478 at the top of the upright 354 and provided at its free end with a notch 480 adapted to receive one of the lugs 474 and hold the cam 426 and the carrier 356 in radially adjusted position. The arm 476 is held yieldingly in operative position by means of a spring 482 and a stop lug 484, by engagement with the top of the upright 354, limits the movement of the arm 476 under the influence of the spring 482. By lifting the arm 476 out of engagement with the lug 474 on the cam 426, the cam may be turned, using the lugs 474 as handles. By thus turning the carrier 356, it is properly positioned with respect to the carrier 144 and when positioned it is retained therein by the arm 476. As the carrier 356 is shifted away from the press, preceding each turning movement thereof, the lug 474 which is held in the notch of the arm 476 will be freed therefrom and the cam and carrier permitted to turn. After the carrier has made a quarter turn, the next lug 474 on the cam 426 will be located opposite the notch in the arm 476 and this lug will enter the notch upon the return of the carrier toward the press.

While it is preferred to employ the specific construction and arrangement of parts shown and described, it will be understood that this construction is not essential except so far as specified in the claims, and may be changed or modified without departing from the broader features of the invention.

The invention having been described, what is claimed as new is:—

1. The combination with a heel-holding device, of means for receiving similarly positioned heels and presenting them successively in different positions to said device, and means for loading the heels into the device in the order and position presented.

2. The combination with a close-fitting heel guide adapted to frictionally resist the passage of heels through it, of means for receiving similarly positioned heels and presenting them successively in different positions adjacent one end of said guide, and means for loading the heels into the guide in stacked formation in the order and position presented and progressively forcing the stacked heels through said guide whereby they are subjected to pressure.

3. The combination with a close-fitting heel guide adapted to frictionally resist the passage of heels through it, of means for receiving similarly positioned heels and presenting them successively in different positions adjacent one end of said guide, means for loading the heels into the guide in stacked formation in the order and position presented and progressively forcing the stacked heels through said guide whereby they are subjected to pressure, and means for receiving the successive differently positioned heels as they emerge from said guide and delivering them in similar positions.

4. The combination with a heel-holding device, of a rotary carrier having a plurality of heel clamps, means for rotating the carrier step-by-step to advance the clamps through a heel-receiving station and a loading station adjacent said holding device, means for causing the heels similarly positioned in the successive clamps at the receiving station to be differently positioned at the loading station, and means for loading the successive heels presented by the clamps at the loading station into said holding device in the order and positions thus presented.

5. The combination with a heel-holding guide, of a carrier adapted to receive similarly positioned heels as they are supplied successively thereto and transfer them to a point adjacent the guide, means for moving certain of the heels relatively to said carrier while being transferred to cause successive heels to be differently positioned at said point, and means for loading the differently positioned heels into the guide.

6. The combination with a heel-holding device, of means for receiving similarly positioned heels, and means for introducing said heels into said device in such positions that they will be arranged in pairs having like end faces in contact and with base to base contacting heels turned 180° relatively to each other.

7. The combination with a heel-holding device, of means for loading heels therein, a member movably mounted in position to receive the heels at a receiving station and transfer them into position to be loaded into the device, and connections between said member and said loading means for throwing said loading means into operation when said member is actuated by engagement with a heel.

8. The combination with a heel-holding device, of means for loading heels therein, a carrier for moving the heels into loading position and a trip device located in position to be actuated by engagement with a heel placed in position to be fed for controlling the operation of the carrier.

9. A machine for operating upon heels having, in combination, a heel-holding device, means for feeding heels into a loading position adjacent one end of said device, means for loading the heels into said device, and means controlled by engagement with the heels introduced into the path of operation of the feeding means for automatically throwing said feeding means and said loading means into operation so as to feed the heels into loading position and to load them into said device.

10. The combination with a heel-holding device, of a device for feeding heels thereto, operating mechanism for the feeding device, means for disconnecting the operating mechanism from the feeding device, and means operated by engagement with a heel presented to the feeding device for preventing the disconnection of the operating mechanism from the feeding device.

11. The combination with a heel-holding device, of a feed member for delivering heels to said device, means for driving the feed member, a clutch for connecting the feed member and the driving means, means for automatically releasing the clutch, and means operated by engagement with a heel presented to the feed member for preventing the disconnection therefrom of the driving means.

12. The combination with a heel-press, of a rotatable carrier, a series of heel clamps mounted thereon, a continuously operating power shaft, mechanism adapted to be connected to said shaft for rotating the carrier step-by-step, a clutch for connecting said mechanism to the power shaft, means for releasing the clutch after a single step movement has been imparted to the feed member, and means operated by the act of inserting a heel in one of the clamps for preventing the operation of the clutch releasing means.

13. The combination with a heel-press, of a series of heel clamps, feed mechanism for moving the clamps successively and intermittently to and from a delivering point, and means controlled by engagement with a heel for throwing said mechanism automatically into operation upon the introduction of a heel in a predetermined position in a clamp at a receiving point.

14. The combination with a heel-press, of a series of heel clamps, feed mechanism for moving the clamps successively and intermittently to and from a delivering point, and a trip device adapted to be manually operated by the inserting of a heel in a predetermined angular position in a clamp at a receiving point, said trip device being connected with and controlling said mechanism so as to start its operation to remove the loaded clamp from the receiving point.

15. The combination with a heel-holding device, of a series of heel clamps, feed mechanism for moving the clamps successively and intermittently to and from a delivering point, and a plurality of trip devices located in positions to be actuated by engagement with different portions of a heel presented to said heel clamps for initiating the operation of the feed mechanism only when the heel has been adjusted in a predetermined position.

16. The combination with a heel-holding device, adapted to hold successive heels in different positions, of means for receiving the successive heels from said device and delivering them in similar positions.

17. The combination with a heel-press, of a device for receiving differently positioned heels as they are discharged from the press, means for uniformly positioning the heels, a conveyer, and means for transferring the heels thus uniformly positioned from said device to the conveyer.

18. The combination with a heel-holding device, and means for receiving similarly positioned heels and successively loading them into said device in different positions, of means for receiving the successive heels from said device and delivering them in similar positions.

19. The combination with a heel press comprising a long close-fitting guide adapted to resist frictionally the passage of the heels through it, of means for receiving similarly positioned heels and loading them successively in different positions in the press, and means for receiving the heels from the press and delivering them in uniform positions.

20. A machine for operating upon heels having, in combination, a heel-press, means for receiving heels, supplied separately thereto in similar positions, means for stacking said heels in the press in similar adjacent groups each consisting of the same number of individual heels arranged in different relative positions and for causing the heels to be finally ejected from the press, and means for subsequently restoring the heels to uniform positions and delivering them from the machine.

21. A machine for operating upon heels having, in combination, a heel-press, a carrier adapted to receive similarly positioned heels and transfer them successively to a loading position adjacent said press, means for changing the positions of certain of the heels relatively to the carrier during their transfer so that a predetermined number of successive heels will be differently positioned as they arrive at the loading position, and means for loading the heels thus positioned into the press and causing the heels to be advanced through the press.

22. A tube-like heel-press comprising four longitudinal side members disposed respectively for engagement with the breast, back and side edges of heels introduced into the press, means for holding said members yieldingly pressed inward, and means for adjusting the four side members toward or away from the medial line of the press to accommodate heels of different sizes.

23. A tube-like heel-press comprising four longitudinal members disposed respectively for engagement with the breast, back and side edges of heels introduced into the press, a yielding link, and a single means for adjusting the four side members through said link toward or away from the medial line of the press.

24. A tube-like heel-press comprising four longitudinal side members disposed respectively for engagement with the breast, back and side edges of heels introduced into the press, and means applied at a plurality of points along each of said side members, with provision for adjusting the same by a single operation to vary the distance of said members from the medial line of the press.

25. A tube-like heel-press comprising four longitudinal side members arranged in oppositely disposed pairs, and means for imparting simultaneous inward movement to said members to adjust the press to operate upon heels of different sizes, said means permitting continued inward movement of the members of one of said pairs after the inward movement of the members of the other pair has been arrested by a heel in the press to enable the press to be adjusted to accommodate heels of different proportions.

26. A tube-like heel-press comprising four longitudinal side members arranged in oppositely disposed pairs, and means for imparting simultaneous inward movement to said members to adjust the press to operate upon heels of different sizes, said means permitting the members of each of said pairs to move inwardly or yield outwardly independently of the members of the other pair to permit the press to automatically adjust itself to differently proportioned heels of the same size.

27. A tube-like heel-press comprising separate longitudinal side members, a spring separate from said side members for applying lateral pressure to the side members, and connections between the spring and the several side members for distributing the pressure of the spring equally among the latter.

28. A tube-like heel-press comprising four longitudinal side members arranged in opposite pairs, a spring for applying lateral pressure to the side members to maintain them in engagement with the edges of a column of heels in the press, and compensating mechanism for distributing the pressure of the spring equally among the several side members irrespective of variations in the ratio of the distances between the two pairs of side members caused by differently proportioned heels of the same size.

29. The combination with a tube-like heel-press, of means for advancing a column of heels through the press, and means controlled by the movement of a heel as it is discharged from the press for transferring the heels to a point remote from the press.

30. The combination with a tube-like heel-press, of means for loading heels into one end of the press and advancing them therethrough, and a device for removing the heels from the opposite end of the press in a plane at right angles to the direction of movement of the heels through the press.

31. The combination with a tube-like heel-press, of means for advancing a column of heels through the press, a carrier located adjacent the discharge end of the press and mounted to rotate in a plane at right angles to the direction of movement of the heels through the press, means for imparting a step-by-step movement to the carrier, a series of clamps on the carrier adapted to receive the heels as they are discharged from the press and support them as the carrier rotates to feed them to an unloading point, and means controlled by the movement of a heel as it is discharged from the press into one of said clamps for causing a step movement to be imparted to the carrier only after said heel has been fed clear of the press.

32. The combination with a tube-like heel-press, of means for advancing a column of heels through the press, a carrier adapted to receive the heels as they are discharged from the press and transfer them to a delivery point, actuating mechanism for the carrier, a clutch for connecting the carrier with said actuating means, and means operated by the movement of a heel as it is transferred from the press to the carrier for operating the clutch to connect the carrier with its actuating mechanism.

33. The combination with a tube-like heel-press, of means for advancing a column of heels through the press, a carrier located adjacent the discharge end of the press and mounted to rotate in a plane at right angles to the direction of movement of the heels through the press, driving means for imparting a step-by-step movement to the carrier, a series of clamps on the carrier adapted to receive the heels as they are discharged from the press and support them as the carrier rotates to feed them to a delivery point, a clutch for connecting the carrier and the driving means, and a member located in the path of movement of the heel being discharged from the press for actuating the clutch to connect the carrier and the driving means after said heel has been fed clear of the press.

34. A machine for operating upon heels having, in combination, a tube-like heel-press, loading and unloading carriers located at opposite ends of the press and operated in unison to respectively present heels successively to one end of the press and receive heels successively from the opposite end of the press, and means for transferring a heel from the loading carrier to the press and thereby imparting advancing movement to the heels in the press and for concurrently ejecting a heel from the unloading carrier.

35. A machine for operating upon heels having, in combination, a heel press, means for unloading heels from the press, means for receiving the heels as they are unloaded from the press and transferring them to a point remote from the press, and means acting concurrently with the unloading means for removing the heels from the transferring means.

36. A machine for operating upon heels having, in combination, a tube-like heel-press, means for loading a heel into the press at one end and concurrently ejecting a heel from the opposite end thereof, a carrier adjacent said opposite end rotative through receiving and delivery stations for receiving the heels from the press and transferring them to the delivery station, and means acting concurrently with the ejection of a heel from the press for ejecting a heel from the carrier.

37. A machine for operating upon heels having, in combination, a heel press comprising a long close-fitting guide through which the heels are made to progress in column formation, a loading carrier adjacent one end of the press adapted to receive heels in like positions and turn them so that the heels will be presented successively in different positions to the press, means for transferring the heels successively from the loading carrier to the press and causing the heels to be advanced through the press, an unloading carrier adjacent the opposite end of the press for receiving the heels as they emerge from the press and restoring them to similar positions, and means for ejecting the heels from the unloading carrier.

38. The combination with a tube-like heel-press, of means for causing heels to progress through the press in column formation, a carrier for receiving the heels as they are discharged from the press and removing them in a direction at right angles to the direction of movement of the heels through the press, means actuated by engagement with a heel after it has been fed beyond the discharge end of the press to impart a step movement to the carrier, and means for extending a side of the press to follow up the rear face of the heel after it has moved beyond the discharge end of the press to provide lateral support for the adjacent heel to prevent sidewise displacement thereof when the end heel is removed by the carrier.

39. A tube-like heel-press having, in combination, four separate longitudinal side members, disposed respectively for engagement with the breast, back and side edges of heels, and means for applying lateral pressure to the side members, and for adjusting them laterally while maintaining the same pressure thereon.

40. A tube-like heel-press having, in combination, separate longitudinal side members, means for applying lateral pressure to the side members, and a single means for limiting the inward movement of all the side members under the influence of said pressure.

41. A tube-like heel-press comprising four longitudinal side members arranged in oppositely disposed pairs and mounted with provision for lateral movement toward and from the medial line of the press, means for yieldingly pressing said members inwardly, and means for causing the individual members of each of said pairs to move laterally in unison independently of the members of the other pair.

42. A tube-like heel press having, in combination, four longitudinal side members arranged in oppositely disposed pairs, and means for supporting the side members with provision for adjustment toward and from the longitudinal medial line of the press arranged to permit lateral movement of the members of one of said pairs independently of lateral movement of the members of the other pair.

43. A tube-like heel press comprising opposed longitudinal side members, pivotally mounted supporting means for each side member movable toward and from each other to adjust the distance between said side members, and means for maintaining the opposed faces of said side members in parallel relation whatever the adjusted position of said supports may be.

44. A tube-like heel-press comprising a pair of longitudinal side members having opposed pressure applying faces, supports upon which said members are pivotally mounted and which are adapted to oscillate to move the members toward and from each other, a spring connected with said supports for yieldingly pressing said members toward each other, and means for maintaining said members with their opposed faces in parallel relation irrespective of the angular positions of said supports.

45. The combination with a heel holding device for receiving and holding heels in end-to-end relation, of a rotary carrier having a plurality of heel clamps, means for rotating the carrier step-by-step to advance the clamps through a heel-receiving station and a heel-loading station adjacent said holding device, and means independent from said carrier for loading the heels into said holding device as they are successively presented by the clamps at the loading station.

46. A machine for assembling pieces of shoe stock having, in combination, a tube-like receptacle through which pieces of stock are advanced in stack formation, means for loading the stock into the receptacle at one end thereof and thereby causing the stock previously loaded into the receptacle to be advanced therethrough, and holding means for receiving the pieces of stock individually as they emerge from the opposite end of the receptacle and removing them from the point of delivery.

47. A machine for assembling pieces of shoe stock having, in combination, a tube-like receptacle through which pieces of stock are advanced in stack formation, means for receiving the pieces at a point removed from the receptacle and transferring them to a loading station adjacent one end of the receptacle, means at said loading station operating in time with said transferring means for loading the stock into the receptacle, and holding means adjacent the opposite end of the receptacle for seizing the pieces of stock after they have passed through the receptacle and delivering them with positive control at a point removed from the receptacle.

48. The combination with a tube-like heel-press, of means for causing the heels to progress through the press in column formation, a rotatable carrier for receiving the heels as they emerge from the press and removing them to a point remote therefrom, normally inoperative actuating mechanism for the carrier, and means controlled by the movements of the heels as they emerge from the press for rendering said actuating mechanism operative.

49. The combination with a tube-like heel-press, of means for causing heels to progress through the press in column formation, a rotatable carrier adjacent one end of the press for receiving the heels as they emerge from the press and removing them to a point remote therefrom, the carrier being adapted also for lateral movement toward and from the press, means adapted to be engaged by the heel emerging from the press to move the carrier laterally away from the press, actuating means for rotating the carrier, a normally inoperative clutch for connecting the carrier with said actuating means adapted to be rendered operative by the lateral movement of the carrier away from the press and means for returning the carrier to its normal lateral position.

50. The combination with a tube-like heel-press, of means for causing heels to progress through the press in column formation, a plurality of heel clamps successively positioned to receive the heels as they are discharged from the press, a carrier upon which the heel clamps are mounted, the carrier being rotatable intermittently in a plane normal to the direction of movement of the heels through the press to transfer the heels to a point remote from the press and also adapted to be moved laterally in said direction by the heel emerging from the press, means for imparting a partial rotation to the carrier after each delivery of a heel to a heel clamp, and means for returning the carrier to its normal lateral position after each partial rotation thereof.

51. A heel press having, in combination, separate longitudinal side members for receiving heels between them, pressure devices disposed at separated points along the press, and means common to said devices for similarly adjusting the latter to vary the distance of said members from the medial line of the press.

52. A heel press having, in combination, opposed longitudinal side members, and means for applying lateral pressure to the side members including a plurality of pressure devices disposed at separated points along the press, adjusting means common to said pressure devices, and releasable means for normally securing said adjusting means in different positions of adjustment, thereby to vary the distance of said side members from the medial line of the press.

53. A heel press having, in combination, four opposed longitudinal side members arranged to form a tube for receiving heels, spring pressure devices disposed at separated points along the press for pressing said four members against the heels, and means common to said devices for adjusting the latter and said side members to accommodate the side members to heels of different sizes while maintaining the same tension of said spring pressure devices.

54. A heel press having, in combination, four separate longitudinal side members forming a box-like structure for receiving heels, and means for applying lateral pressure to the four side members including spring pressure devices disposed at separated points along the press, means for limiting the movement of the side members under the influence of said spring pressure devices, and means common to the latter for bodily adjusting the side members to vary their distance from the medial line of the press.

55. A heel press having, in combination, four separate longitudinal side members forming a box-like structure for engagement with heels introduced in column formation into the press, and means for applying lateral pressure to the four side members including spring-pressed elements associated with said members at separated points along the press, means cooperating with the individual spring-pressed elements to limit the movements of the side members under the influence of the spring pressure, and means common to said spring-pressed elements and operating therethrough to vary the distance of the side members from the medial line of the press, that the latter may be adjusted to accommodate heels of different sizes.

56. A heel press having, in combination, two pairs of opposed longitudinal side members forming a box-like structure for engagement with the heels, and means for applying oppositely acting lateral pressure to each pair of the side members including spring-pressed devices disposed at separated points along the press and each having means to vary the spring pressure thereof independently, and means bodily to adjust said devices.

57. A tube-like heel press having, in combination, pairs of longitudinal side members for engagement with the heels introduced into the press, each of said pairs having its members oppositely disposed, and spring pressure devices for applying lateral pressure to the pairs of side members, said devices having means for independently varying their spring pressure.

58. A tube-like heel press having, in combination, pairs of longitudinal side members for engagement with heels introduced into the press, each of said pairs having its members oppositely disposed, carriers for said side members, and spring pressure means operating through said carriers for pressing the side members into engagement with the heels.

59. A heel press having two pairs of opposed longitudinal side members forming a box-like structure for engagement with heels introduced into the press, adjusting means for varying the distance of the members of each pair from the medial line of the press to accommodate heels of different sizes, and pressure means operating independently of said adjusting means with provision for varying the pressure of said side members against the heels.

60. The combination with a heel holding device for receiving and holding heels in end-to-end relation, of a rotary carrier having a plurality of heel clamps, means for rotating the carrier step-by-step to advance the clamps through a heel receiving station, and a heel loading station adjacent the holding device, and means at said loading station for engaging the heels and thrusting the same from said clamps into the holding device as they are successively presented by the clamps at the loading station.

61. The combination with a press having provision for receiving pieces of stock in column formation, of a revolving carrier having at least four stock holding clamps each comprising a pair of jaws for receiving and holding a piece of stock between them, and means for transferring the pieces of stock held by the clamps into the said press when the former are brought into registration with the latter.

62. The combination with a heel press for receiving heels in column formation, of a rotary carrier adjacent the receiving end of the press and having clamps thereon, each comprising spring-pressed members for receiving and holding a heel between them, said carrier being rotatable to bring the clamps successively to a loading position at the receiving end of the press, that the heels may be transferred from the clamps into the press.

63. The combination with a heel press open at both ends, of a loading mechanism including a rotary carrier having clamps thereon, each comprising spring-pressed members for receiving a heel or piece of stock between them, means to rotate said carrier step-by-step to bring the clamps opposite the receiving end of the press, and means including a member for thrusting the heels or pieces of stock from the clamps into the press to be thus forced therethrough.

FRED V. HART.